United States Patent [19]

Ikeda et al.

[11] Patent Number: 5,647,551
[45] Date of Patent: Jul. 15, 1997

[54] TAPE CASSETTE HAVING REDUCED DROP-OUT ERROR BY SELECTED SIZING OF GAPS BETWEEN A CLAMPER AND AN ENGAGEMENT CAVITY IN THE HUB

[75] Inventors: Tatehiko Ikeda; Haruomi Enomoto; Tomoaki Shimazu, all of Tochigi-ken, Japan

[73] Assignee: Kao Corporation, Tokyo, Japan

[21] Appl. No.: 544,974

[22] Filed: Oct. 30, 1995

[30] Foreign Application Priority Data

Nov. 11, 1994 [JP] Japan ..................... 6-277407

[51] Int. Cl.$^6$ .................... G11B 23/087; B65H 19/28
[52] U.S. Cl. .................... 242/345; 242/586.2; 360/132
[58] Field of Search ................... 242/586.2, 532.5, 242/332.7, 345, 348.1; 360/132

[56] References Cited

U.S. PATENT DOCUMENTS 4,290,562 9/1981 Sasaki et al. ................... 242/586.2

Primary Examiner—John Q. Nguyen
Attorney, Agent, or Firm—Oblon, Spivak, McClelland, Maier & Neustadt, P.C.

[57] ABSTRACT

The tape cassette comprising a hub, an engagement cavity recessed on the outer periphery of the hub, and a clamper fitted into the engagement cavity, wherein the base end part of a tape is engaged between the engagement cavity and the clamper, and the tape is wound around the hub, characterized in that opposite inner upper edges of the engagement cavity each have first end portions and opposite side edges on a tape winding surface of the clamper each have second end portions facing the first end portions, and each of gaps between the first end portions and the second end portions is dimensioned to be about 0.02 mm to about 0.10 mm.

3 Claims, 4 Drawing Sheets

– 1 –

TAPE CASSETTE HAVING REDUCED DROP-OUT ERROR BY SELECTED SIZING OF GAPS BETWEEN A CLAMPER AND AN ENGAGEMENT CAVITY IN THE HUB

BACKGROUND OF THE INVENTION

1. Field of the Invention

The present invention relates to a tape cassette, and more particularly to a tape cassette in which a drop-out or an error may not occur during regenerating the information recorded on the tape.

2. Description of the Related Art

In the conventional tape cassette as shown in FIG. 4, a pair of hubs 1' around which a tape 2' is wound are accommodated in a cassette case C'. In the following description, the explanation will be given to only one of the hubs 1', but the same should be applied to the other hub 1'. The tape 2' wound around the hub 1' comprises a magnetic tape and a leader tape. One end of the magnetic tape is connected to one end of the leader tape. As shown in FIG. 5, the other end of the leader tape, i.e., a base end part 21' of the tape 2' is engaged between an engagement cavity 11' recessed on the outer periphery of the hub 1' and a clamper 12' fitted into the engagement cavity 11'.

In the tape cassette described above, when the base end part 21' of the tape 2' is engaged between the engagement cavity 11' and the clamper 12', and the tape 2' winds around the hub 1', a stepped part or a gap is formed as represented by phantom lines in FIG. 6 (phantom lines are shown in the left side end only for convenience of illustration). Accordingly, "transcription phenomenon" occurs, that is, the tape 2' which winds around the hub 1' having the stepped part or the gap is subjected to marks or traces impressed at the part corresponding to the stepped part or the gap of the hub 1'. The marks or traces thus impressed are sequentially transcribed to the following winding layer of the tape 2' (tape 2' is omitted in FIG. 6 for convenience of illustration). In particular, on the tape surface adjacent to the hub 1', the transcribed linear marks perpendicular to the longitudinal direction of the tape 2' stand out. When the tape 2' having such transcription marks impressed thereon is used to record or reproduce signals, signal omission is liable to occur at the transcription marks, thereby causing drop-outs or errors.

To reduce such errors, extensive investigations have been made to provide a hub 1' having no stepped part as represented by phantom lines in FIG. 6. However, even with the hub 1' having no stepped part, the errors cannot be completely eliminated.

SUMMARY OF THE INVENTION

It is, therefore, an object of the present invention to provide a tape cassette which can further reduce the drop-out or error.

The inventors have found that the above object can be accomplished by further narrowing the gap as represented by d' in FIG. 6 in the tape cassette as shown in FIG. 4, the gap being formed between first end portions 11a', 11a' on the opposite inner upper edges of the engagement cavity 11', and second end portions 12a', 12a', facing the first end portions 11a', 11a', on the opposite side edges on a tape winding surface of the clamper 12.

The present invention is made based on the above findings and provides a tape cassette comprising a hub 1, an engagement cavity 11 recessed on the outer periphery of the hub 1, and a clamper 12 fitted into the engagement cavity 11, wherein the base end part of a tape is engaged between the engagement cavity 11 and the clamper 12, and the tape is wound around the hub 1, characterized in that opposite inner upper edges of the engagement cavity 11 each have first end portions 11a, 11a, and opposite side edges on a tape winding surface of the clamper 12 each have second end portions 12a, 12a facing the first end portions 11a, 11a, and each of gaps between the first end portions 11a, 11a and the second end portions 12a, 12a is dimensioned to be about 0.02 mm to about 0.10 mm.

The tape cassette of the present invention enables to prevent the tape from being received in the gap between the first end portions on the opposite inner upper edges of the engagement cavity and the second end portions on the opposite side edges on the tape winding surface of the clamper, and to prevent the tape from winding in the deformed state, so that the local stress concentration on the tape caused thereby can be reduced. Therefore, the drop-outs or errors during regenerating the information on the tape is reduced.

DETAILED DESCRIPTION OF THE PREFERRED EMBODIMENT

Figure 1:
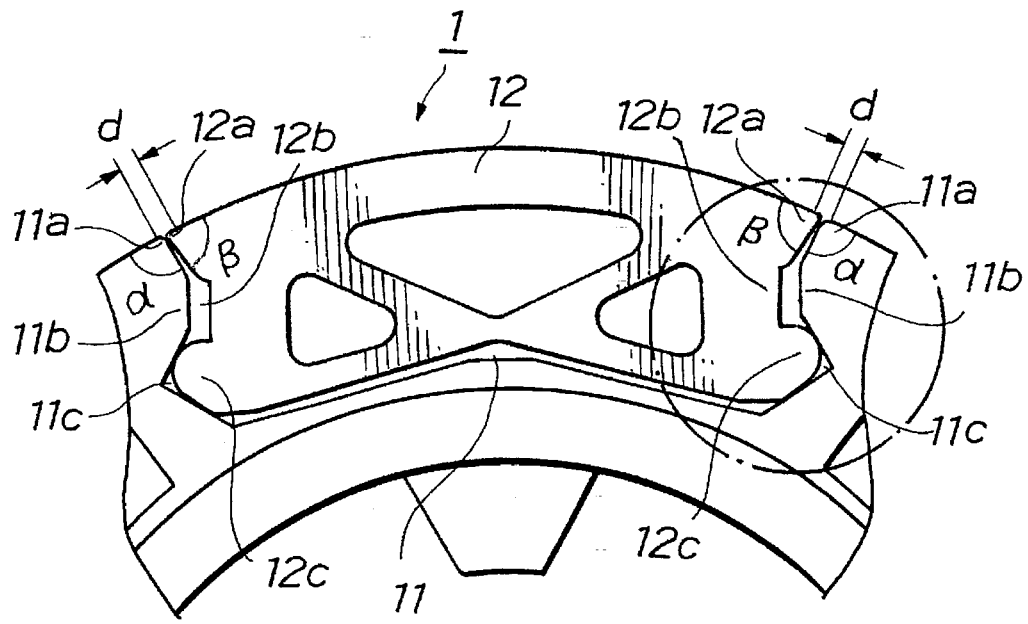
FIG. 1 is a fragmentary side view showing a main portion of a tape cassette according to an embodiment of the present invention, in which a clamper is fitted into an engagement cavity.
Figure 2:
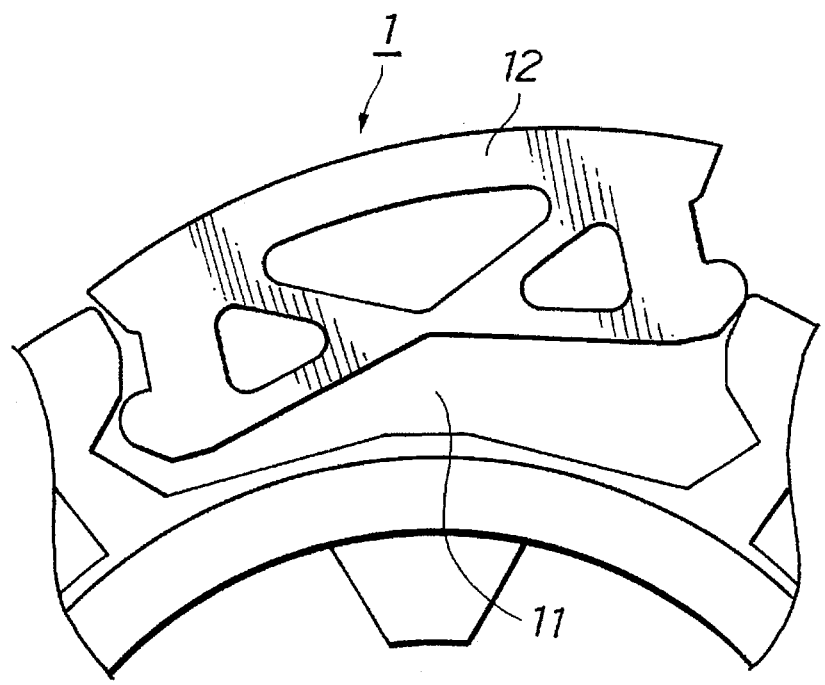
FIG. 2 is a fragmentary side view showing the main portion of the tape cassette according to the embodiment, in which the clamper is not fitted into the engagement cavity.
Figure 3:
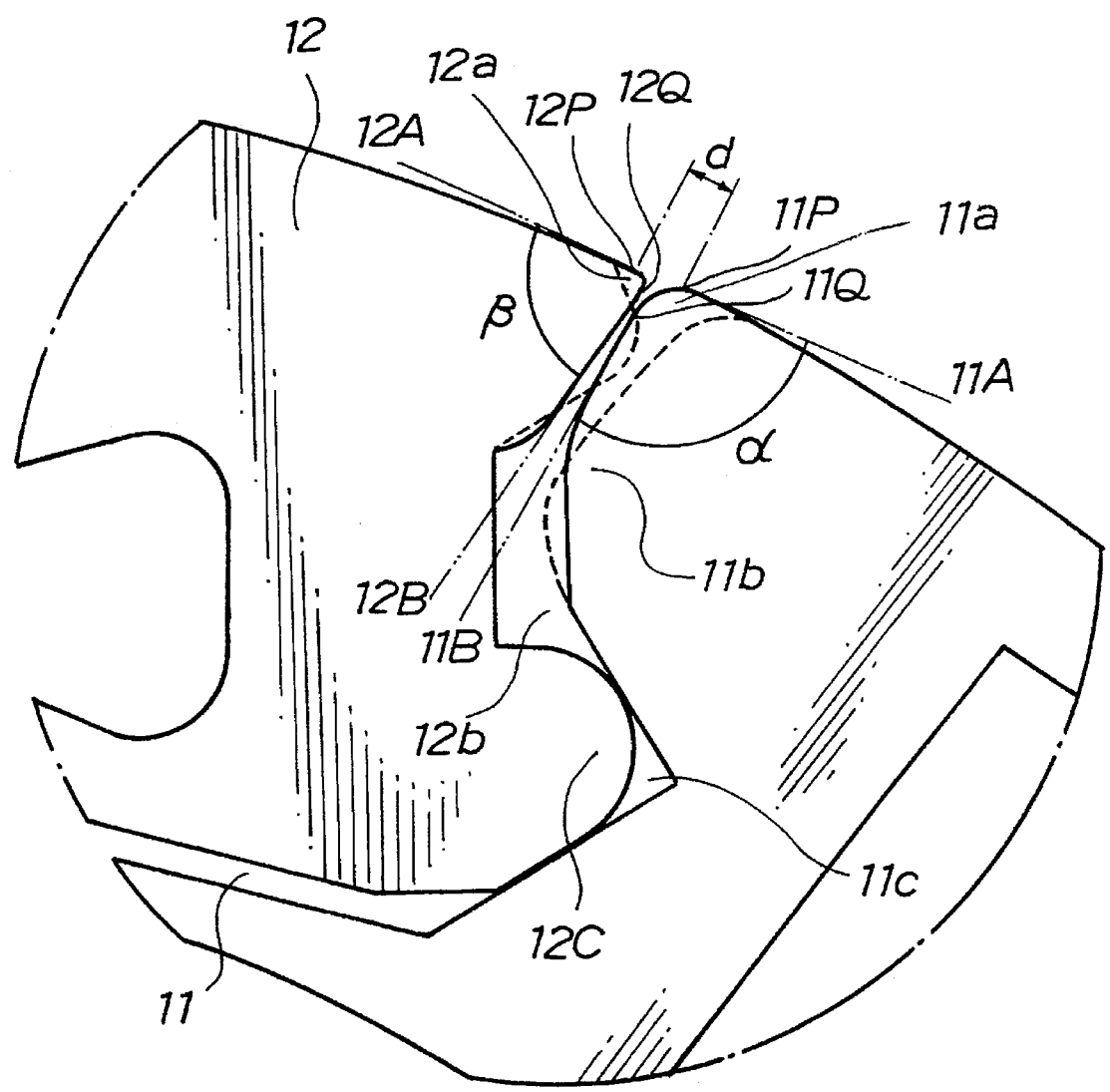
FIG. 3 is an enlarged fragmentary side view showing the first end portions on the opposite inner upper edges of an engagement cavity and the second end portions on the opposite side edges of a clamper in the hub of the tape cassette of the embodiment of the present invention and in the hub of a conventional tape cassette.
Figure 4:
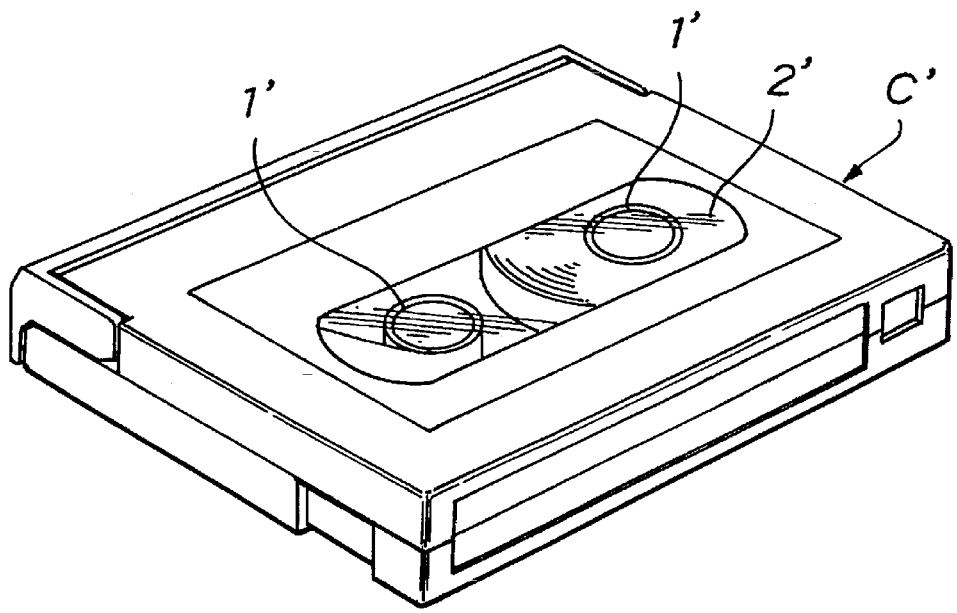
FIG. 4 is a perspective view showing an appearance of a conventional tape cassette.
Figure 5:
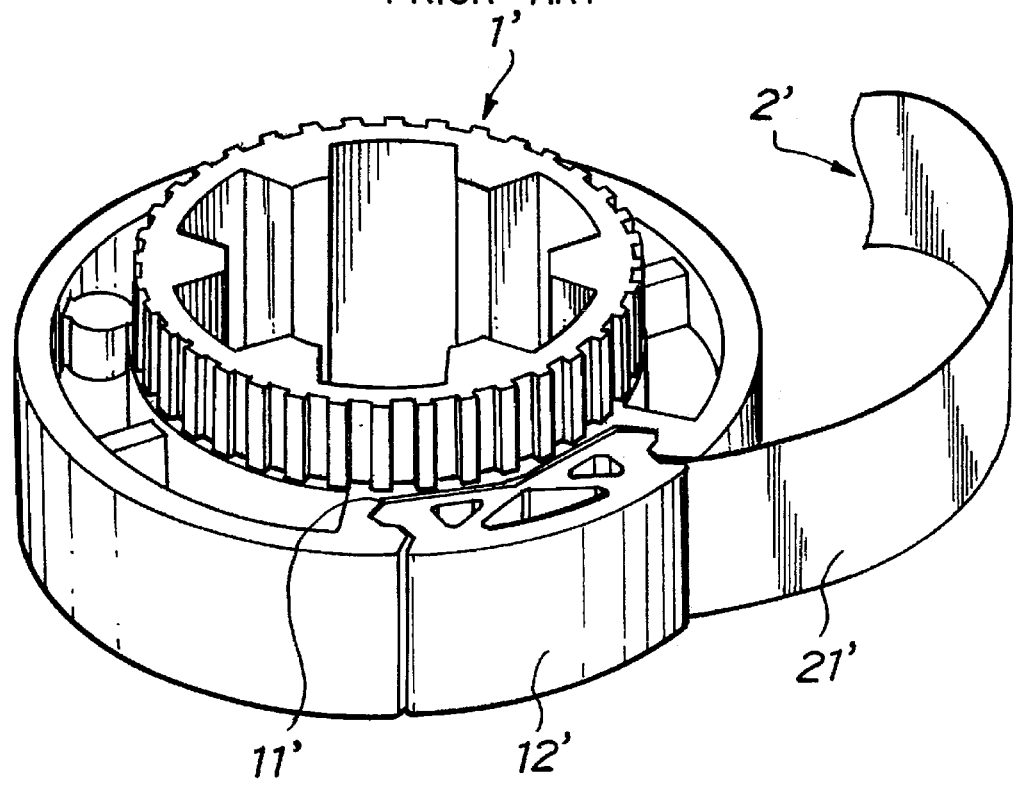
FIG. 5 is a perspective view showing an appearance of a hub of a conventional tape cassette.

Hereinafter, an embodiment of the tape cassette according to the present invention will be described in detail with reference to the accompanying drawings. FIGS. 1 to 3 show a hub of the tape cassette according to the embodiment of the present invention. FIG. 1 is a fragmentary side view showing a main portion of a tape cassette according to an embodiment of the present invention, in which a clamper is fitted into an engagement cavity. FIG. 2 is a fragmentary side view showing the main portion of the tape cassette according to the embodiment, in which the clamper is not fitted into the engagement cavity. FIG. 3 is an enlarged fragmentary side view showing the first end portions on the opposite inner upper edges of an engagement cavity and the second end portions on the opposite side edges of a clamper in the hub of the tape cassette of the present invention and in the hub of a conventional tape cassette. Incidentally, the tape is not shown in FIGS. 1 to 3 for convenience of illustration.

In the tape cassette according to this embodiment, a pair of hubs 1, 1 with a tape wound therearound are accommodated in a cassette body. In the following description, the explanation will be given to only one of the hubs 1, but the same should be applied to the other hub 1. The tape wound around the hub 1 comprises a magnetic tape and a leader tape. One end part of the magnetic tape is connected to one end part of the leader tape. The other end part of the leader tape, i.e., the base end part of the tape is engaged between an engagement cavity 11 recessed on the outer periphery of the hub 1 and a clamper fitted into the engagement cavity 11. Thus, in these features, the tape cassette of the present invention is configurated in the same manner as conventional tape cassettes.

In the tape cassette of this embodiment, as shown in FIGS. 1 to 3, a gap d between each of the first end portions 11a, 11a on the opposite inner upper edges of the engagement cavity 11 and each of the second end portions 12a, 12a, facing the first end portions 11a 11a, on the opposite side edges on a tape winding surface of the clamper 12 is dimensioned to be about 0.02 mm to about 0.10 mm, preferably about 0.05 mm to about 0.08 mm. More specifically, "the gap d" used herein refers to a distance between the curvature changing points 12P and 11P, that is, a distance between the curvature changing point 12P in each of second end portions 12a, 12a on the opposite side edges on a tape winding surface of the clamper 12 and the curvature changing point 11P in each of first end portions 11a, 11a, which are the end portions facing the second end portions 12a, 12a, on the opposite inner upper edges of the engagement cavity 11.

This embodiment will be described in more detail. The engagement cavity 11 is formed by recessing a part of the outer peripheral portion of the hub 1. As shown in FIG. 1, the engagement cavity 11 has a pair of opposite projections 11b, 11b which are formed on the outer peripheral side of the hub 1 and spaced from each other at a prescribed distance, and a pair of recesses 11c, 11c which are formed on the inner peripheral side of the hub 1 and spaced from each other at a distance a little wider than that between the pair of projections 11b, 11b. The above-mentioned first end portions 11a, 11a of the opposite inner upper edges are located above the pair of the projections 11b, 11b. An angle α each at the corners of the first end portions 11a, 11a ranges from about 85° to about 100°. The term "angle α" as used herein refers to an angle formed by the tangential lines 11A and 11B as shown in FIG. 3, that is, an angle formed by the tangential line 11A of the hub 1 at the curvature changing point 11P on the outer periphery of the hub 1 and the tangential line 11B of the circle (not shown), which has a curvature before the changing, at the curvature changing point 11Q which appears when the curvature of the first end portions 11a, 11a is measured from the location where the first end portions 11a, 11a are opposed to the second end portions 12a, 12a toward the corners.

The above-mentioned clamper 12 is so contoured as to fit into the engagement cavity 11. The clamper 12 has a pair of recesses 12b, 12b which face the above-mentioned projections 11b, 11b respectively when the clamper 12 is engaged into the cavity 11, and a pair of projections 12c, 12c which fit into the pair of recesses 11c, 11c respectively when engaged. The above-mentioned second end portions 12a, 12a are located above the pair of recesses 12b, 12b. An angle β each at the corners of the second end portions 12a, 12a ranges from about 75° to about 85°. The term "angle β" as used herein refers to an angle formed by the tangential lines 12A and 12B as shown in FIG. 3, that is, an angle formed by the tangential line 12A of the clamper 12 at the curvature changing point 12P on the tape winding surface of the clamper 12 and the tangential line 12B of the circle (not shown), which has a curvature before the changing, at the curvature changing point 12Q which appears when the curvature of the second end portions 12a, 12a is measured from the location where the second end portions 12a, 12a are opposed to the first end portions 11a, 11a toward the corners.

In the cassette tape according to the present embodiment, since the angle α each at the corners of the first end portions 11a, 11a on the opposite inner upper edges and the angle β each at the corners of the second end portions 12a, 12a on the opposite side edges are defined within the above-mentioned ranges, the gap d can be dimensioned to be about 0.02 mm to about 0.10 mm, and the clamper 12 can be easily fitted into the engagement cavity 11.

In the tape cassette according to this embodiment, the base end part of the tape is engaged between the cavity 11 and the clamper 12, as shown in FIG. 2, by pushing the clamper 12 into the engagement cavity 11 from the outer peripheral side of the hub 1 while placing the base end part of the tape under the clamper 12 so as to fit the clamper 12 into the cavity 11. On completion of the fitting, the base end part of the tape is engaged between the cavity 11 and the clamper 12.

Figure 6:
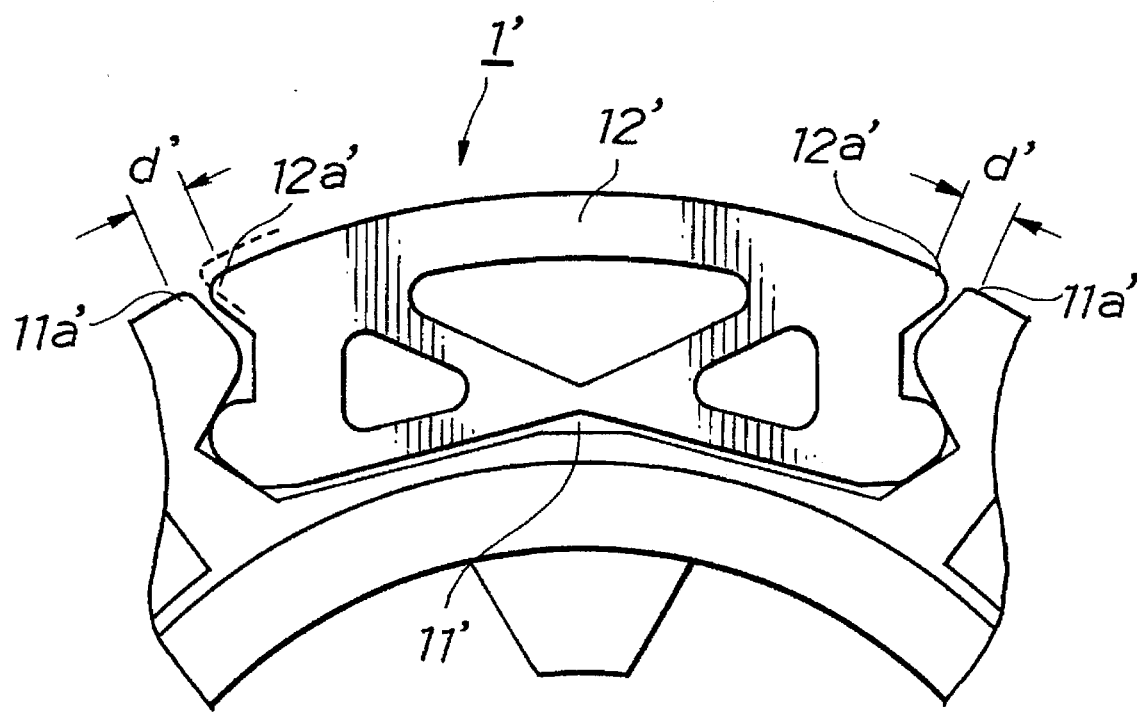
FIG. 6 is a fragmentary side view showing a main portion of a conventional tape cassette, in which the clamper is fitted into the engagement cavity.

FIG. 3 is an enlarged view showing the portion denoted by a circle in FIG. 1. In FIG. 3, solid lines denote the tape cassette according to the embodiment of the present invention while phantom lines denote the above-mentioned tape cassette shown in FIG. 6. In the tape cassette according to this embodiment, when the gap d is less than 0.02 mm, the leader tape becomes difficult to engage between the clamper 12 and hub 1, since the space for inserting the leader tape is narrow. When the gap d exceeds 0.10 mm, generation of the local stress concentration in the tape cannot be reduced since the tape is liable to be easily received in the gap d when the tape is wound around the hub 1. In the tape cassette of this embodiment, the pair of first end projections 11b, 11b are less projected than those of the cassette tape as shown in FIG. 6 so that the clamper 12 can be easily fitted into the cavity 11.

Since the tape cassette according to the present invention is so designed as to define the gap d to be dimensioned within the range of about 0.02 mm to about 0.10 mm, the tape can be prevented from being received in the gap between the first end portions on the opposite inner upper edges of the engagement cavity and the second end portions on the opposite side edges on the tape winding surface of the clamper, and the tape winding in the deformed state can be prevented, so that the local stress concentration on the tape caused thereby can be reduced. Therefore, the drop-outs or errors during regenerating the information on the tape is reduced.

It should be noted that the present invention is not limited to the foregoing embodiment. Specifically, no limitation is imposed on the contours of the engagement cavity and the clamper, and the way they are engaged, as far as the conditions that the base end part of the tape is engaged between the engagement cavity and the clamper, and that the gap between the first end portions on the opposite side edges of the clamper and the second end portions on the opposite side edges on the tape winding surface of the clamper is dimensioned within the range of about 0.02 mm to about 0.10 mm. The other features can be also varied or modified without departing from the spirit and scope of the present invention. Further, no limitation is imposed on the type of the tape cassette, and the tape cassette of the present invention can be used as, for example, VHS video tape cassettes or 8 mm VTR tape cassettes.

The advantageous effects of the present invention will be described by way of Example and Comparative Examples.

EXAMPLE 1, AND COMPARATIVE EXAMPLES 1, 2 AND 3

Test samples described below (Example 1, and Comparative Examples 1, 2 and 3) were prepared (the test samples of Comparative Examples are all commercially available), and the error rate (rate of the generation of errors) of each test sample was measured in accordance with the procedure described below. The obtained results are shown in Table 1.

[Test Samples]

Example 1: DAT cassette in which the gap d in a hub of a tape cassette according to the embodiment of the present invention as shown in FIG. 1 is set to about 0.08 mm.

Comparative Example 1: DAT cassette (commercially available) in which the gap d' in a conventional hub as shown in FIG. 6 is set to about 0.13 mm.

Comparative Example 2: DAT cassette (commercially available) in which the gap d' in the conventional hub as shown in FIG. 6 is set to about 0.18 mm.

Comparative Example 3: DAT cassette (commercially available) in which the gap d' in the conventional hub as shown in FIG. 6 is set to about 0.34 mm.

Each of the test samples is configurated in completely the same manner, except that they employed the above-mentioned respective hubs.

[Method of Measuring Error Rate]

An error rate per one minute was measured at the middle portion of the tape on which a single wave-length of 1 KHz was recorded. It can be judged that the smaller the numerical value of the error rate, the lower the rate of the generation of errors.

TABLE 1

|  | Error Rate |
| --- | --- |
| Example 1 | $6.6 \times 10^{-4}$ |
| Comparative Example 1 | $9.0 \times 10^{-3}$ |
| Comparative Example 2 | $2.7 \times 10^{-2}$ |
| Comparative Example 3 | $1.0 \times 10^{-2}$ |

As is apparent from the above results, the tape cassette of the present invention (Example 1) exhibits lower error rate than the conventional tape cassettes (Comparative Examples 1 to 3) do.

What is claimed is:

1. A tape cassette comprising a hub, an engagement cavity recessed on the outer periphery of said hub, and a clamper fitted into said engagement cavity, wherein a base end part of a tape is engaged between said engagement cavity and said clamper, and said tape is wound around said outer periphery of said hub, characterized in that said hub having inner upper edges at opposite sides of said engagement cavity, said inner upper edges having outer curvature changing points at which the respective curvatures change from the curvature of the outer periphery, said clamper having a tape winding surface including opposite side edges, said opposite side edges having opposite second end portions each having an outer curvature changing point at which the curvature changes from the curvature of the winding surface, wherein the outer curvature changing points of said inner upper edges of said hub are separated from respective of said outer curvature changing points of said opposite side edges of said clamper by a gap dimensioned to be about 0.02 mm to about 0.10 mm.

2. The tape cassette according to claim 1, wherein said inner upper edges of said hub each have an inner curvature changing point, first tangent lines through said inner curvature changing points of said upper edges of said hub, second tangent lines through said outer curvature changing points of said inner upper edges of said hub, so that an angle α is formed by said first and second tangent lines, said angle α exists in a vertex that is positioned over said inner upper edges of said hub, and said angle α ranges from about 85° to about 100°, and said second end portions of said clamper each having an inner curvature changing point, third tangent lines through said inner curvature changing points of said second end portions of said clamper, fourth tangent lines through said outer curvature changing points of said second end portions of said clamper, so that an angle β is formed by said third and fourth tangent lines, said angle β exists in a vertex that is positioned over said second end portions of said clamper, and said angle β ranges from about 75° to about 85°.

3. The tape cassette according to claim 1, wherein each of said gaps is dimensioned to be about 0.05 mm to about 0.08 mm.

* * * * *